US010050322B2

(12) United States Patent
Liu et al.

(10) Patent No.: US 10,050,322 B2
(45) Date of Patent: Aug. 14, 2018

(54) COAXIAL FILTER AND METHOD FOR MANUFACTURING THE SAME (71) Applicant: TELEFONAKTIEBOLAGET LM ERICSSON (PUBL), Stockholm (SE)

(72) Inventors: Jian Liu, Nanjing (CN); Xiang Gao, Nanjing (CN); Bo Zhou, Nanjing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 21 days.

(21) Appl. No.: 15/128,615

(22) PCT Filed: Mar. 24, 2014

(86) PCT No.: PCT/CN2014/073935
§ 371 (c)(1),
(2) Date: Sep. 23, 2016

(87) PCT Pub. No.: WO2015/143597
PCT Pub. Date: Oct. 1, 2015

(65) Prior Publication Data
US 2017/0110776 A1     Apr. 20, 2017

(51) Int. Cl.
*H01P 1/202* (2006.01)
*H01P 5/02* (2006.01)
*H01P 3/06* (2006.01)
*H01P 11/00* (2006.01)
(Continued)

(52) U.S. Cl.
CPC ............ *H01P 1/202* (2013.01); *G06F 17/11* (2013.01); *G06F 17/5009* (2013.01); *H01P 3/06* (2013.01); *H01P 5/026* (2013.01); *H01P 11/005* (2013.01); *H01P 11/007* (2013.01); *G06F 2217/12* (2013.01)

(58) Field of Classification Search
CPC .. H01P 1/202; H01P 3/06; H01P 5/026; H01P 11/005
USPC ........................... 333/33, 125, 206, 236, 245
See application file for complete search history.

(56) References Cited

U.S. PATENT DOCUMENTS 3,602,848 A * 8/1971 Leonard ................. H01P 1/202
                                                                333/206
4,473,807 A    9/1984 Weber et al.
5,493,261 A    2/1996 Kitoh et al.
(Continued)

FOREIGN PATENT DOCUMENTS

CN    102473992 A    5/2012
JP    H09246804 A    9/1997

OTHER PUBLICATIONS

Lu, et al., A Compact Highpass Filter with Broad Passband, 2010 International Conference on Microwave and Millimeter Wave Technology (ICMMT), pp. 976-978.
(Continued)

Primary Examiner — Rakesh Patel
(74) Attorney, Agent, or Firm — Sage Patent Group (57) ABSTRACT A coaxial filter is provided. The coaxial filter comprises a first port, a second port, at least two capacitor segments each having two metal layers and a dielectric layer between them, and at least one grounded inductor stub connected to a metal layer of the at least two capacitor segments. The at least two capacitor segments are coaxially connected in series between the first port and the second port. An axis of the at least one grounded inductor stub is vertical to an axis of the at least two capacitor segments.

15 Claims, 6 Drawing Sheets (51) Int. Cl.
    *G06F 17/11*    (2006.01)
    *G06F 17/50*    (2006.01)

(56) References Cited

U.S. PATENT DOCUMENTS

| | | | |
|---|---|---|---|
| 6,566,985 B2 * | 5/2003 | Niiranen | H01P 1/205 |
| | | | 333/202 |
| 2009/0153270 A1 | 6/2009 | Beerwerth | |
| 2012/0133457 A1 | 5/2012 | Nita | |

OTHER PUBLICATIONS

Menzel, et al., Low-Loss Ultra-Wideband (UWB) Filters Using Suspended Stripline, Asia-Pacific Conference Proceedings, APMC 2005.
Shaman, et al., An Optimum Ultra-Wideband (UWB) Bandpass Filter with Spurious Response Suppression, Wireless and Microwave Technology Conference WAICON 2006.

* cited by examiner (a) Prior Art (b) Prior Art

COAXIAL FILTER AND METHOD FOR MANUFACTURING THE SAME

This application is a 371 of International Application No. PCT/CN2014/073935, filed Mar. 24, 2014, the disclosure of which is fully incorporated herein by reference.

TECHNICAL FIELD

Example and non-limiting embodiments of the present invention generally relate to coaxial filters, and specifically to a high pass coaxial filter and method for manufacturing the same.

BACKGROUND

This section introduces aspects that may facilitate a better understanding of the disclosure. Accordingly, the statements of this section are to be read in this light and are not to be understood as admissions about what is in the prior art or what is not in the prior art.

Figure 1:
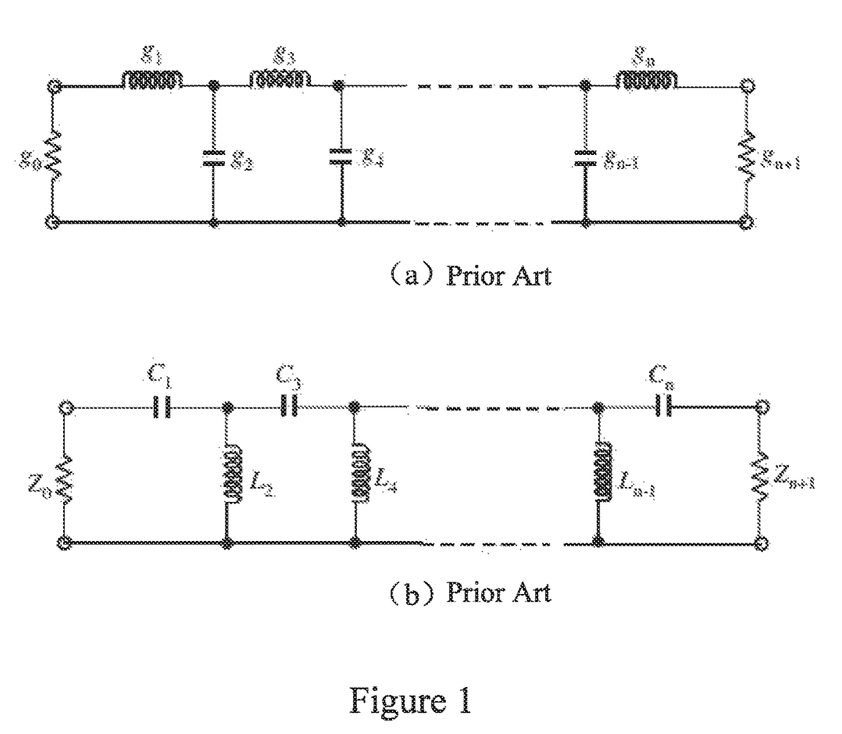
FIG. 1(a) illustrates a lumped-element low pass prototype.
FIG. 1(b) illustrates a lumped-element high pass filter transformed from the lumped-element low pass prototype.

A high pass filter is a very important component in a microwave communications system. A broad pass band, compact size and high power capacity are often required for a high pass filter. High pass filters constructed from quasi-lumped elements may be desirable for many applications, provided that these elements can achieve a good approximation of desired lumped elements over an entire operating frequency band. As known, a lumped element is designed so that electric or magnetic energy is concentrated in it at specified frequencies, and inductance or capacitance may therefore be regarded as concentrated in it, rather than distributed over the length of the element. For example, capacitors and inductors as shown in FIG. 1 are lumped elements. The actual dimension of a lumped element is much less than the operating wavelength. Compared to the lumped element, a quasi-lumped element is more frequency-dependent and behaves approximately as a lumped element as long as its maximum dimension is small compared with the operating wavelength.

Care should be taken when designing filters using quasi-lumped elements because as the size of any quasi-lumped element becomes comparable with the wavelength at an operating frequency, it no longer behaves as a lumped element.

The simplest form of a high pass filter may just consist of a series of capacitors, which is often found in applications for direct current (DC) blocking. For more selective high pass filters, more elements are required. This type of high pass filters can be easily designed based on a lumped-element low pass prototype as shown in FIG. 1(a), wherein $g_1$ denotes the element value normalized by a terminating impedance $Z_0$ and obtained at a low pass cutoff frequency $\Omega_c$. The cutoff frequency is a frequency characterizing a boundary between a passband and a stopband of a filter. It is usually taken to be a point in the filter response where a transition band and pass band meet, for example, as defined by a 3 dB corner (a frequency for which the output of the filter is −3 dB of the nominal passband value). If frequency mapping $$\Omega = -\frac{\omega_c \Omega_c}{\omega}$$

is applied, wherein $\Omega$ and $\omega$ are angular frequency variables of the low pass and high pass filters respectively, and $\omega_c$ is the cutoff frequency of the high pass filter, any serial inductive element in the low pass prototype may be transformed to a capacitive element in the high pass filter, with a capacitance $$C_i = \frac{1}{Z_0 \omega_c \omega_c g_i}.$$

Likewise, any shunt capacitive element in the low pass prototype may be transformed to a shunt inductive element in the high pass filter, with an inductance $$L_i = \frac{Z_0}{\omega_c \omega_c g_i}.$$

FIG. 1(b) illustrates such a lumped-element high pass filter resulting from the transformations.

Various transmission line structures have been applied to design high pass filters. Most of the filters implemented with this technique up to now are mainly based on such structures as stubs and quarter- or half-wavelength resonators, which may lead to a less compact size. In microwave and radio-frequency engineering, a stub is a length of transmission line or waveguide that is connected at one end only. The free end of the stub is either left open-circuit or short-circuited. Neglecting transmission line losses, the input impedance of the stub is purely reactive; either capacitive or inductive, depending on the electrical length of the stub, and on whether it is open or short circuit. Stubs may thus be considered to be frequency-dependent capacitors and frequency-dependent inductors. The quarter/half-wavelength resonator has a length of a quarter/half of the wavelength corresponding to the central frequency of the resonator. The lumped-element filter design is generally unpopular due to the difficulty for use at microwave frequencies along with limitations of lumped-element values. For a higher operating frequency, a lumped element with a smaller value is required. However, a lumped element with a too small value is difficult to fabricate.

Conventional microstrip filters lack sharpness at lower frequencies and suffer from larger insertion loss and poor impedance matching, specifically at high frequencies.

In particular, an existing solution disclosed in Reference document [1] uses a stripline structure to implement a high pass filter, which however has some problems, such as some stubs are difficult to fabricate; electrical lengths of connecting lines are relatively long; and tuning screws have to be used to reach required performance. Another existing solution disclosed in Reference document [2] uses a suspended stripline to implement an ultra-wideband filter. However, this solution has a low power capacity and the suspended line has to be fabricated by using a laser beam to meet a certain manufacturing accuracy and power capacity. Yet another existing solution disclosed in Reference document [3] uses a microstrip line to implement a bandpass filter. However, due to the microstrip line structure and low power capacity, the pass band of such a filter is relatively narrow and thus unsatisfactory.

REFERENCE DOCUMENTS

[1] Desen Lu, Qingyuan Wang, Ao Liao, Xianrong Zhang, "A Compact Highpass Filter with Broad Passband", Microwave and Millimeter Wave Technology (ICMMT), 2010 International Conference on, pp:976-978

[2] Menzel, Wolfgang, Rahman Tito, Mohammad S., Lei Zhu, "Low-Loss Ultra-Wideband (UWB) Filters using Suspended stripline", Microwave Conference Proceedings, 2005, APMC 2005, Asia-Pacific Conference Proceedings Volume 4

[3] Shaman Hussein, Jia-Sheng Hong, "An Optimum Ultra-Wideband (UWB) Bandpass Filter with Spurious Response Suppression", Wireless and Microwave Technology Conference, 2006, WAMICON '06. IEEE Annual, Pages 1-5

SUMMARY

Various embodiments of the invention aim at addressing at least part of the above problems and disadvantages. Other features and advantages of embodiments of the invention will also be understood from the following description of specific embodiments when read in conjunction with the accompanying drawings, which illustrate, by way of example, the principles of embodiments of the invention.

Various aspects of embodiments of the invention are set forth in the appended claims and summarized in this section.

In a first aspect of the invention, there is provided a coaxial filter. The coaxial filter comprises a first port and a second port. The coaxial filter also comprises at least two capacitor segments each having two metal layers and a dielectric layer between them, and at least one grounded inductor stub connected to a metal layer of the at least two capacitor segments. The at least two capacitor segments are coaxially connected in series between the first port and the second port. An axis of the at least one grounded inductor stub is vertical to an axis of the at least two capacitor segments.

In one embodiment, a common metal layer between two adjacent dielectric layers of any two directly connected capacitor segments is connected to a grounded inductor stub.

In one embodiment, the coaxial filter may further comprise a first conductor through which the first port is coupled to a first capacitor segment of the series of the at least two capacitor segments; and a second conductor through which the second port is coupled to a second capacitor segment of the series of the at least two capacitor segments. The first and second capacitor segments may be arranged respectively at two ends of the series of the at least two capacitor segments.

In another embodiment, the coaxial filter may further comprise a first impedance converter that is coaxially connected between the first conductor and the first capacitor segment and configured to eliminate an impedance discontinuity of the coaxial filter, and a second impedance converter that is coaxially connected between the second conductor (221) and the second capacitor segment and configured to eliminate the impedance discontinuity of the coaxial filter.

In yet another embodiment, a width of the first impedance converter may be larger than a width of the first conductor and smaller than a width of the first capacitor segment. The width of the second impedance converter may be larger than the width of the second conductor and smaller than the width of the second capacitor segment.

In yet another embodiment, a width of the grounded inductor stub may be smaller than a thickness of the metal layer to which the grounded inductor stub is connected.

In yet another embodiment, the coaxial filter may comprise at least three capacitor segments and at least two grounded inductor stubs. Any two of the at least two grounded inductor stubs that are connected to a same capacitor segment may be arranged respectively on two sides of a plane that is vertical to the axes of the at least two grounded inductor stubs and contains the axis of the at least three capacitor segments. Axes of the at least two inductor stubs may be parallel to each other.

In yet another embodiment, the coaxial filter may comprise an odd number of the capacitor segments. The odd number of the capacitor segments may be symmetrically arranged relative to a middle line of the coaxial filter.

In yet another embodiment, any two of the at least two grounded inductor stubs that are connected to the same capacitor segment may have different widths.

In yet another embodiment, the at least two inductor stubs may have a same length.

In yet another embodiment, each of the at least two capacitor segments may be of a cylindrical or rectangular shape and have a same width.

In yet another embodiment, each of the at least one grounded inductor may be of a cylindrical or rectangular shape.

In a second aspect of the invention, there is provided an apparatus comprising the coaxial filter according to the first aspect of the invention.

In a third aspect of the invention, there is provided a method for manufacturing a coaxial filter. The coaxial filter to be manufactured comprises a first port, a second port, at least two capacitor segments each having two metal layers and a dielectric layer between them, and at least one grounded inductor stub. The method comprises determining equivalent capacitances and inductances respectively for the capacitor segments and the grounded inductor stubs according to a desired cutoff frequency and constructing a capacitor model for each of the capacitor segments and an inductor model for each of the grounded inductors. The method also comprises performing simulations, based on the constructed capacitor model, the constructed inductor model and the calculated equivalent capacitances and inductances, to obtain values for dimension parameters of the at least two capacitor segments and the at least one inductor stubs. The method further comprises fabricating the coaxial filter based on the obtained values such that: the at least two capacitor segments and the at least one inductor stub have dimensions as indicated by the obtained values; the at least two capacitor segments are coaxially connected in series between the first port and the second port; the at least one grounded inductor stubs is connected to the metal layers of the at least two capacitor segments; and an axis of the at least one grounded inductor stub is vertical to an axis of the at least two capacitor segments.

According to particular embodiments as described in this specification, a high pass coaxial filter with a compact size, broad bandwidth, low insertion loss and high power capacity is provided. Furthermore, the coaxial filter according to some embodiments of the present invention is much easier to fabricate compared to the existing solutions.

Other features and advantages of the embodiments of the present invention will become apparent from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description with reference to the accompanying drawings, in which like reference numerals or letters are used to designate like or equivalent elements. The drawings are illustrated for facilitating better understanding of the embodiments of the invention and not necessarily drawn to scale, in which.

DETAILED DESCRIPTION

Hereinafter, the principle and spirit of the present invention will be described with reference to the illustrative embodiments. It should be understood, all these embodiments are given merely for the skilled in the art to better understand and further practice the present invention, but not for limiting the scope of the present invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. For example, features illustrated or described as part of one embodiment may be used with another embodiment to yield still a further embodiment.

It shall be understood that, although the terms "first", "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprise", "have", "include", "contain" and/or their derivatives, when used herein, specify the presence of stated features, elements, and/or components etc., but do not preclude the presence or addition of one or more other features, elements, components and/or combinations thereof.

It shall be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

In the following description and claims, unless defined otherwise, all technical and scientific terms used herein have the same meaning as commonly understood by one of ordinary skilled in the art to which this invention belongs.

Figure 2:
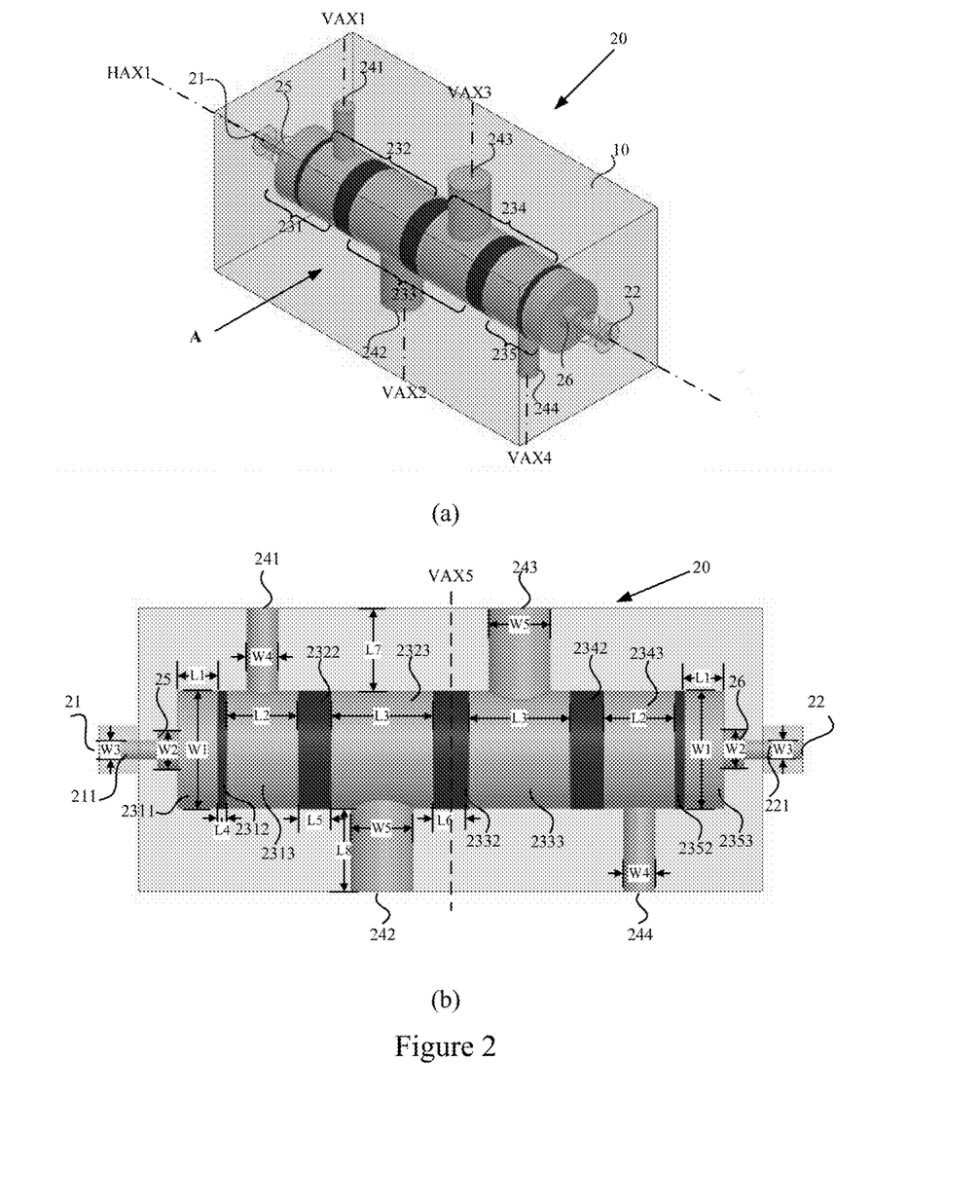
FIG. 2(a) illustrates a three-dimensional (3D) view of an example coaxial filter according to an embodiment of the present invention.
FIG. 2(b) illustrates a side view of the coaxial filter as seen from the direction of arrow A in FIG. 2(a)

Reference is first made to FIG. 2, in which a structure of an example coaxial filter 20 according to an embodiment of the present invention is illustrated, wherein FIG. 2(a) illustrates a three-dimensional (3D) view of the coaxial filter 20 and FIG. 2(b) illustrates a side view of the coaxial filter 20 as seen from the direction of arrow A in FIG. 2(a). In FIGS. 2(a) and (b), a same reference number refers to a same component.

The coaxial filter 20 according to the embodiment of the present invention is a two port device that comprises a first port 21 and a second port 22 as illustrated. The first port 21 and the second port 22 may be exchangeable used as an input port and an output port of the coaxial filter 20.

The illustrated coaxial filter 20 comprises five capacitor segments 231-235, each having two metal layers and a dielectric layer that is seamlessly connected between them. The five capacitor segments 231-235 are coaxially connected in series between the first port 21 and the second port 22. It shall be appreciated that the term "coaxially" used herein means that all of the connected capacitor segments and the first port and the second port are arranged to have a common axis HAX1 as illustrated in FIG. 2(a). With this serial and coaxial arrangement of the capacitor segments, a common metal layer is formed between two adjacent dielectric layers of two directly connected capacitor segments. In other words, two capacitor segments in series are constructed from three metal layers and two dielectric layers with one metal layer in common. For example, the capacitor segment 231 as illustrated in FIG. 2(a) has two metal layers 2311, 2313 and a dielectric layer 2312, while the capacitor segment 232 directly connected to the capacitor segment 231 also includes the metal layer 2313 but in combination with a dielectric layer 2322 and metal layer 2323 instead. That is, the two capacitor segments 231 and 232 are constructed from three metal layers 2311, 2313, 2323 and two dielectric layers 2312, 2322 with the metal layer 2313 in common. Hereafter, the metal layer between two adjacent dielectric layers in the coaxial filter will be referred to as a common metal layer.

In one embodiment, the dielectric layer of each capacitor segment may be made of Teflon with a dielectric constant of 2.1. According to cutoff frequency and bandwidth requirements, other dielectric materials with different dielectric constants may be chosen to make the dielectric layer, for example Rogers 5880 with a dielectric constant of 2.2 or a kind of printed circuit board (PCB) material FR-4 with a dielectric constant of 4.4.

The illustrated coaxial filter 20 according to the embodiment of the present invention further comprises four metal stubs 241-242. For each of the metal stubs, one end is connected to ground and the other end is connected to a metal layer of one capacitor segment so as to form an inductor. Hereafter, a metal stub will be referred to as a grounded inductor stub. In the illustrated embodiment, all grounded inductor stubs 241-242 are connected to the common metal layers 2313, 2323, 2333 and 2343. No grounded inductor stub is connected to the metal layers 2311 and 2353, which are located at two ends of the series of the capacitor segments 231-235. However, it shall be understood that the metal layers at the ends may also be connected to grounded inductor stubs and it is not necessary that every common metal layer is connected to a grounded inductor stub. Additionally, without any limitation to the general disclosure of the present invention, numbers of the capacitor segments and grounded inductor stubs in FIG. 2 are chosen to be five and four respectively. It shall be understood that more or less capacitor segments and grounded inductor stubs are also possible, depending on performance requirements. Generally, the coaxial filer according to embodiments of the present invention comprises at least two capacitor segments and at least one grounded inductor stub.

In the illustrated embodiment, axes VAX1-VAX4 of the four grounded inductor stubs 241-244 are vertical to the axis HAX1 of the capacitor segments 231-235 and parallel to each other. Preferably, all axes of the grounded inductor stubs 241-245 and the capacitor segments 231-235 are coplanar.

Preferably, a width of the grounded inductor stub may be smaller than a thickness of the metal layer to which it is connected. For example as illustrated in FIG. 2(b), the width W4 of the grounded inductor stub 241 is smaller than the thickness of the metal layer 2313 to which it is connected; and the width W5 of the grounded inductor stub 242 is smaller than the thickness of the metal layer 2323 to which it is connected, and the like. It shall be appreciated that the term "axis" of a component used herein refers to a longitudinal axis of the component; the term "thickness" of a layer used herein is defined along the axis of the layer; and the term "width" of a component used herein is defined in a direction perpendicular to the axis of the component.

The thickness of each of the dielectric layers may be determined according to a desired capacitance. In a preferable embodiment, the capacitor segments arranged at two ends of the series of capacitor segments are required to have a large capacitance, which limits the thicknesses of the dielectric layers of these capacitor segments to be much thinner than others. For example, the thickness L4 of the dielectric layer 2312 as illustrated in FIG. 2(b) is much thinner than the thicknesses L5 and L6 of dielectric layers 2322 and 2332.

In one embodiment, the coaxial filter 20 may also comprise a first conductor through which the first port 21 may be coupled to a first capacitor segment of the series of the capacitor segments and a second conductor through which the second port 22 may be coupled to a second capacitor segment of the series of the capacitor segments, wherein the first and second capacitor segments are arranged respectively at two ends of the series of the capacitor segments. The first and second conductors may also be termed as first and second inner conductors hereafter. In the illustrated embodiment of FIG. 2, the first port 21 is coupled through the first conductor 211 to the first capacitor segment 231 of the series of the capacitor segments 231-235 and the second port 22 is coupled through the second conductor 221 to the second capacitor segment 235 of the series of the capacitor segments 231-235.

In this embodiment, the coaxial filter 20 may further comprise a first impedance converter 25 and a second impedance converter 26 as illustrated. The first impedance converter 25, which may be a segment of metal conductor, is coaxially connected between the first conductor 211 and the first capacitor segment 231, and configured to eliminate an impedance discontinuity of the coaxial filter 20 that is caused by different dimensions of the first conductor 211 and the first capacitor segment 231. The second impedance converter 26, which may also be a segment of metal conductor, is coaxially connected between the second conductor 221 and the second capacitor segment 235, and configured to eliminate the impedance discontinuity of the coaxial filter that is caused by different dimensions of the second conductor 221 and the second capacitor segment 231. With this configuration, the return loss caused by impedance mismatching at the input port of the coaxial filter may be dramatically reduced. As a result, the insertion loss, i.e. the loss of signal power resulting from the insertion of the coaxial filter according to the embodiment of the present invention is low.

The coaxial filter 20 according to embodiments of the present invention is a two port device. The first port 21 and the second port 22 may be exchangeable used as the input port and the output port of coaxial filter 20. Therefore, the first conductor 211 and the first impedance converter 25 are preferably symmetrical to the second conductor 221 and the second impedance converter 26 with respect to a middle line VAX5 of the coaxial filter 20.

In one embodiment, a width W2 of the first impedance converter 25 may be larger than a width W3 of the first conductor 211 and smaller than the width W1 of the first capacitor segment 231. The width W2 of the second impedance converter 26 is larger than the width W3 of the second conductor 221 and smaller than the width W1 of the second capacitor segment 235.

In one embodiment in which the coaxial filter 20 has more than two capacitor segments and more than one grounded inductor stub, any two grounded inductor stubs that are connected to a same capacitor segment may be arranged on two sides of a plane that is vertical to the axes of the two grounded inductor stubs and contains the axis of the capacitor segments. For example, as illustrated in FIG. 2 (b), the coaxial filter 20 comprises five capacitor segments 231-235 and four grounded inductor stubs 241-244. The two grounded inductor stubs 241 and 242 are connected to the same capacitor segment 232 and accordingly arranged on two sides of the plane that is vertical to the axes VAX1-VAX4 and contains the axis HAX1. That is, one (e.g. 241) of the two grounded inductor stubs connected to the same capacitor segment (e.g. 232) is arranged above the plane and the other one (e.g. 242) of the two grounded inductor stubs connected to the same capacitor segment is arranged below the plane. Preferably, lengths of the two grounded inductor stubs are equal. In the example as illustrated in FIG. 2(b), the length L7 of the grounded inductor stubs 241, 243 is equal to the length L8 of the grounded inductor stubs 242, 244. It shall be appreciated that the "length" of a component used herein is defined along the axis of the component.

In a further embodiment, in order to achieve good bandwidth performance and sharpness at the cutoff frequency, the coaxial filter 20 may preferably have an odd number of the capacitor segments, which are arranged symmetrically relative to the middle line of the coaxial filter, e.g. VAX5 as illustrated in FIG. 2(b). The dimensions of the odd number of the capacitor segments may also be symmetrical relative to the middle line VAX5. For example, the coaxial filter 20 may comprise 2n+1 (n=1, 2, 3 . . . ) capacitor segments and 2n (n=1, 2, 3 . . . ) grounded inductor stubs. In such a case, two grounded inductor stubs which are connected to the same capacitor segment may be arranged on two sides of the plane that is vertical to the axes of the 2n grounded inductor stubs and contains the axis of the 2n+1 capacitor segments.

In this embodiment, two grounded inductor stubs which are connected to the same capacitor segment may be preferably configured to have different widths. Further preferably, two adjacent grounded inductor stubs on the same side of the plane may be configured to have different widths. For example, the two adjacent grounded inductor stubs 241 and 243 above the plane are configured to have two different widths W4 and W5, while the other two adjacent grounded inductor stubs 242 and 245 below the plane are configured to have two different widths W5 and W4. However, a person skilled in the art shall understand that although FIG. 2(*b*) illustrates two widths for the grounded inductor stubs, the widths of the grounded inductor stubs may be differently adjusted according to performance requirements and are not limited to the illustrated ones.

In above embodiments, the grounded inductor stubs and the capacitor segments, the inner conductors and the impedance converters described with reference to FIG. 2 are of a cylindrical shape for easiness of fabrication. In some other embodiments, these components may be of a rectangular shape. In some other embodiments, some of these components may be of a cylindrical shape and others may be of rectangular shape.

In practical applications, the coaxial filter according to embodiments of the present invention will be placed in a housing, which may be a metal box having six side walls with a certain thickness. For example, as illustrated in FIG. 2(*a*), the coaxial filter 20 is placed in a housing 10. The housing may provide at least two functions. First, all inductor stubs of the coaxial filter may be connected to the housing to be grounded, although other manners for grounding the inductor stubs are also possible and also fall within the scope of the present invention. Second, the space between the coaxial filter 20 and the housing 10 may be filled with a dielectric material, which is usually air. Since the equivalent inductance of the grounded inductor stubs and the equivalent capacitance of the capacitor segments are calculated relative to the dielectric constant of the material surrounding the coaxial filter, the filled dielectric material may affect the equivalent capacitance and inductance and in turn affect the impedance, cutoff frequency, bandwidth etc. of the coaxial filter.

The coaxial filter according to embodiments of the present invention may be applied into microwave communications systems. Especially, the coaxial filter according to embodiments of the present invention may be applied into a radio frequency (RF) testing apparatus, for example to test spurious noises at higher frequencies in RF signals transmitted from a base station. The coaxial filter according to embodiments of the present invention may also be applied to other microwave apparatuses which need a high pass filter.

Figure 3:
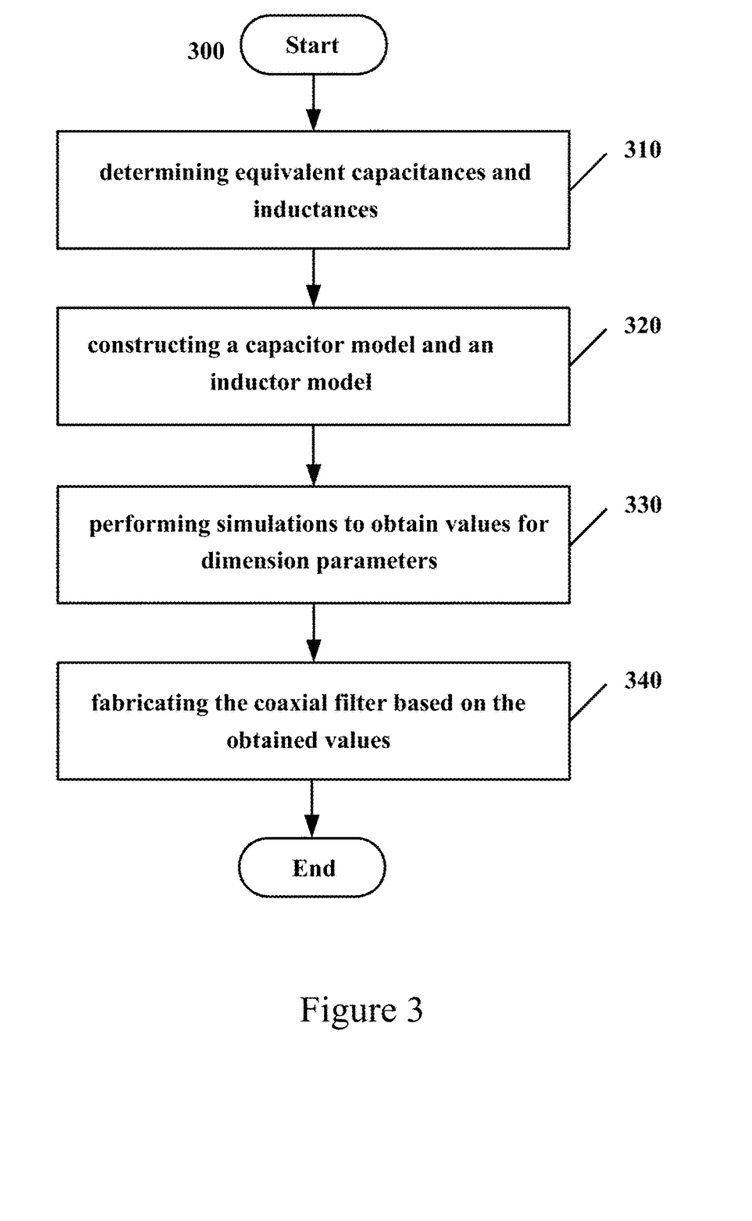
FIG. 3 illustrates a method for manufacturing a coaxial filter according to an embodiment of the present invention.

FIG. 3 illustrates a method 300 for manufacturing a coaxial filter according to an embodiment of the present invention. In this embodiment, the coaxial filter to be manufactured will be constituted of at least two capacitor segments each having two metal layers and a dielectric layer between them, and at least one grounded inductor stub as described with reference to FIG. 2 and comprise a first port and second port.

Figure 4:
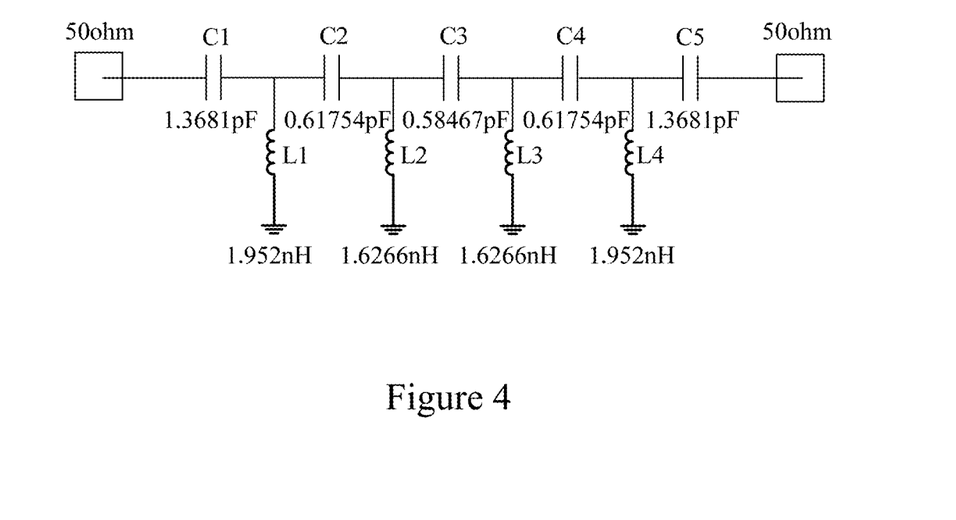
FIG. 4 illustrates an equivalent circuit of the coaxial filter to be manufactured using the method as shown in FIG. 3.

The method 300 comprises, in block 310, determining equivalent capacitances and inductances respectively for the at least two capacitor segments and the at least one grounded inductor stub according to a desired cutoff frequency. For example, if the desired cutoff frequency is 2.7 GHz, the method 300 may determine values of the equivalent capacitances and inductances as indicated in an equivalent circuit of the coaxial filter in FIG. 4. Various approaches for determining values of the equivalent capacitances and inductances are well known in the art and thus will not be detailed herein for a purpose of simplicity and brevity.

Figure 5:
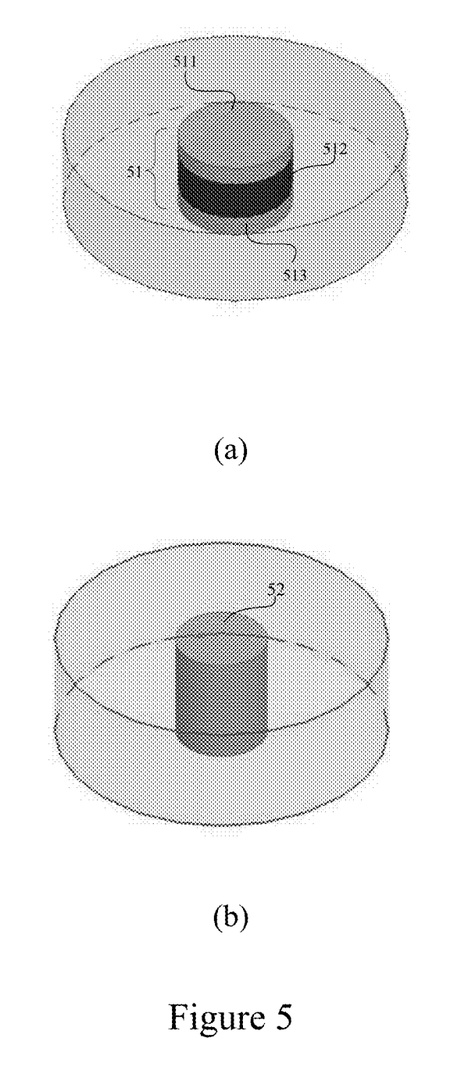
FIG. 5(a) illustrates a capacitor model.
FIG. 5(b) illustrates an inductor model.

Then in block 320, the method 300 constructs a capacitor model for each of the capacitor segments and an inductor model for each of the grounded inductors. FIG. 5(*a*) illustrates a capacitor model 51. The capacitor model 51 comprises three layers 511-513, wherein the layers 511 and 513 represent metal layers and the layer 512 represents a dielectric layer, for example a Teflon layer with a dielectric constant of 2.1. FIG. 5(*b*) illustrates an inductor model 52, which may be made of the same metal material as the metal layers 511 and 513.

Subsequently in block 330, the method 300 performs simulations, based on the constructed capacitor model, the constructed inductor model and the determined equivalent capacitances and inductances, to obtain values for dimension parameters of the at least two capacitor segments and the at least one inductor stub, which may include a width and thickness of each of the metal layers, a width and thickness of each of the dielectric layers, a width and length of each of the at least inductor stub.

In one embodiment, a High Frequency Structure Simulator (HFSS) which is a full-wave electromagnetic solver, may be used to construct the capacitor model and the inductor model and then perform the simulations to obtain the values for dimension parameters of the at least two capacitor segments and the at least one inductor stub. The HFSS is well-known commercial software. Usage and functions of the HFSS will not be detailed herein for the purpose of simplicity and brevity.

Once all values for the dimension parameters are obtained, then in block 340, the coaxial filter is fabricated based on the obtained values such that the at least two capacitor segments and the at least one inductor stub have dimensions as indicated by the obtained values, and such that the at least two capacitor segments are coaxially arranged in series between the first port and the second port; the at least one grounded inductor stub is connected to the metal layers of the at least two capacitor segments; and an axis of the at least one grounded inductor stub is vertical to an axis of the at least two capacitor segments and parallel to each other if more than one grounded inductor stub exists.

Although the method 300 is described and illustrated in a certain order, a person skilled in the art shall understand that the method 300 is not necessarily to be performed in the illustrated order. Operations in some blocks may be performed in parallel or reversely without departing from the scope of the present invention.

In one embodiment, the coaxial filter to be manufactured may further comprise a first conductor through which the first port is coupled to a first capacitor segment of the series of the at least two capacitor segments; and a second conductor through which the second port is coupled to a second capacitor segment of the series of the at least two capacitor segments, wherein the first and second capacitor segments are arranged respectively at two ends of the series of the at least two capacitor segments. In this embodiment, the dimension parameters in block 330 may further comprise a width and a length of each of the first and second conductors.

In this embodiment, the coaxial filter to be manufactured may further comprise a first impedance converter that is coaxially connected between the first conductor and the first capacitor segment, and configured to eliminate an impedance discontinuity of the coaxial filter; and a second impedance converter that is coaxially connected between the second conductor and the second capacitor segment, and configured to eliminate the impedance discontinuity of the coaxial filter. Therefore, the dimension parameters in block 330 may further comprise a width and a length of each of the first and second impedance converters.

Figure 6:
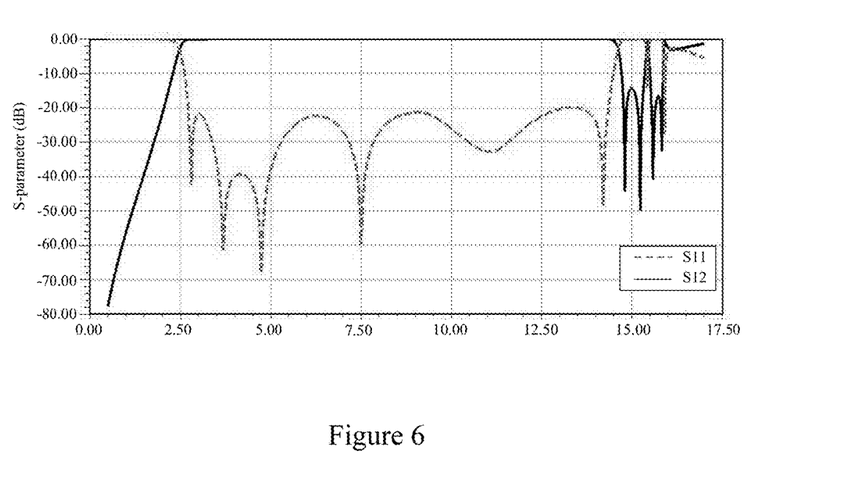
FIG. 6 shows simulation results for the coaxial filter as illustrated in FIG. 2.

FIG. 6 shows simulation results for the coaxial filter 20 as illustrated in FIG. 2. In this simulation, the coaxial filter 20 is configured to comprise five capacitor segments 231-235, four grounded inductor stubs 241-244, two inner conductors 211, 221 and two impedance converters 25, 26. The width W1 of each capacitor segment is 6 mm. The width W4 of the thinner grounded inductor stubs 241, 244 is 1.6 mm, and the width W5 of the thicker grounded inductor stubs 242, 243 is 3.2 mm. The thicknesses L4, L5 and L6 of the dielectric layers of the capacitor segments 231-235 are 0.5 mm, 1.7 mm and 1.8 mm respectively. The thicknesses L1, L2, L3 of the metal layers of the capacitor segments 231-235 are 2 mm, 3.6 mm and 5.2 mm respectively. The width W2 of the impedance converters 25, 26 is 2 mm. The length of the impedance converters is 1 mm. The length of the first and second inner conductors 211, 221 is 1 mm. The length of all grounded inductor stubs is 4.2 mm. Based on these values of the dimension parameters, the simulation results of |S11|, which is defined as an input reflection coefficient of a dual port device with its output port being terminated by a matched load, and |S21|, which is defined as a forward transmission insertion loss of the dual port device with its output port being terminated by a matched load can be observed at several frequencies, are obtained and shown in FIG. 6. The simulation results indicate that the cutoff frequency of the coaxial filter 20 is 2.7 GHz; the bandwidth of the coaxial filter 20 is from 2.7 GHz to 14.2 GHz; and the insertion loss is within 0.3 dB. The dimension of the coaxial filter 20 is about 32 mm×14.4 mm×14.4 mm.

The above simulation results present some advantages of the coaxial filter according to embodiments of the present invention. For example, the coaxial filter according to embodiments of the present invention offers sharpness at the cutoff frequency, a broader bandwidth, lower insertion loss and higher power capacity compared to the existing solutions. Also, the coaxial filter according to embodiments of the present invention provides a compact size, which is much less than the wavelength at an operating frequency. Furthermore, the coaxial filter according to embodiments of the present invention has a less number of capacitor segments and inductor stubs compared to the existing solutions, and therefore it is much easier to fabricate. In addition, in this coaxial filter, the dielectric layers are made of a cheap dielectric material Teflon, which may result in a low cost.

It will be obvious to a person skilled in the art that, as the technology advances, the inventive concept can be implemented in various ways. The invention and its embodiments are not limited to the examples described above but may vary within the scope of the claims.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination.

Moreover, although features may be described above as acting in certain combinations and even initially claimed as such, one or more features from a claimed combination can in some cases be excised from the combination, and the claimed combination may be directed to a sub-combination or variation of a sub-combination.

While the invention has been described in terms of several embodiments, those skilled in the art will recognize that the invention is not limited to the embodiments described, and can be practiced with modification and alteration within the disclosure and scope of the appended claims. The description is thus to be regarded as illustrative instead of limiting. The reference numerals listed in the claims are not intended to limit the scope of the invention and merely to facilitate a better understanding of the invention.

What is claimed is:

1. A coaxial filter, comprising:
   a first port;
   a second port;
   at least two capacitor segments each having two metal layers and a dielectric layer between them, wherein the at least two capacitor segments are coaxially connected in series between the first port and the second port;
   at least one grounded inductor stub connected to a metal layer of the at least two capacitor segments;
   a first conductor through which the first port is coupled to a first capacitor segment of the series of the connected at least two capacitor segments;
   a second conductor through which the second port is coupled to a second capacitor segment of the series of the connected at least two capacitor segments;
   a first impedance converter that is coaxially connected between the first conductor and the first capacitor segment, and configured to eliminate an impedance discontinuity of the coaxial filter; and
   a second impedance converter that is coaxially connected between the second conductor and the second capacitor segment, and configured to eliminate the impedance discontinuity of the coaxial filter,
   wherein the first and second capacitor segments are arranged respectively at two ends of the series of the connected at least two capacitor segments, and
   an axis of the at least one grounded inductor stub is perpendicular to an axis of the at least two capacitor segments.

2. The coaxial filter according to claim 1, wherein:
   a common metal layer between two adjacent dielectric layers of any two directly connected capacitor segments of the at least two capacitor segments is connected to the at least one grounded inductor stub.

3. The coaxial filter according to claim 1, wherein:
   each of the at least one grounded inductor is of a cylindrical or rectangular shape.

4. An apparatus comprising the coaxial filter according to claim 1.

5. The coaxial filter according to claim 1, wherein:
   a width of the first impedance converter is larger than a width of the first conductor and smaller than a width of the first capacitor segment; and
   the width of the second impedance converter is larger than the width of the second conductor and smaller than the width of the second capacitor segment.

6. The coaxial filter according to claim 1, wherein:
   a width of the at least one grounded inductor stub is smaller than a thickness of a common metal layer to which the at least one grounded inductor stub is connected.

7. The coaxial filter according to claim 1, wherein:
the at least two capacitor segments includes at least three capacitor segments and the at least one grounded inductor stub includes at least two grounded inductor stubs,
wherein any two, of the at least two grounded inductor stubs, that are connected to a same capacitor segment of the at least two capacitor segments are arranged respectively on two sides of a plane that is perpendicular to axes of the at least two grounded inductor stubs and contains the axis of the at least three capacitor segments; and
the axes of the at least two grounded inductor stubs are parallel to each other.

8. The coaxial filter according to claim 1, comprising:
an odd number of the at least two capacitor segments; wherein
the odd number of the at least two capacitor segments are symmetrically arranged relative to a middle line of the coaxial filter.

9. The coaxial filter according to claim 1, wherein:
each of the at least two capacitor segments is of a cylindrical or rectangular shape and has a same width.

10. The coaxial filter according to claim 1, wherein:
the at least one grounded inductor stub includes at least two inductor stubs and the at least two inductor stubs have a same length.

11. A coaxial filter, comprising:
a first port;
a second port;
at least two capacitor segments each having two metal layers and a dielectric layer between them;
at least two grounded inductor stubs and any two, of the at least two grounded inductor stubs, that are connected to a same capacitor segment have different widths,
wherein the at least two capacitor segments are coaxially connected in series between the first port and the second port and comprise an odd number of capacitor segments that are symmetrically arranged relative to a middle line of the coaxial filter, and
an axis of the at least two grounded inductor stubs is perpendicular to an axis of the at least two capacitor segments.

12. A method for manufacturing a coaxial filter, wherein the coaxial filter comprises a first port, a second port, at least two capacitor segments each having two metal layers and a dielectric layer between them, and at least one grounded inductor stub, the method comprising:
determining equivalent capacitances and inductances respectively for the capacitor segments and the grounded inductor stubs according to a desired cutoff frequency;
constructing a capacitor model for each of the capacitor segments and an inductor model for each of the grounded inductors;
performing simulations, based on the constructed capacitor model, the constructed inductor model and the calculated equivalent capacitances and inductances, to obtain values for dimension parameters of the at least two capacitor segments and the at least one inductor stubs;
fabricating the coaxial filter based on the obtained values such that:
the at least two capacitor segments and the at least one inductor stub have dimensions as indicated by the obtained values;
the at least two capacitor segments are coaxially connected in series between the first port and the second port;
the at least one grounded inductor stub is connected to the metal layers of the at least two capacitor segments; and
an axis-of the at least one grounded inductor stub is perpendicular to an axis of the at least two capacitor segments.

13. The method for manufacturing the coaxial filter according to claim 12, wherein
the dimension parameters include:
a width and a thickness of each of the metal layers of the at least two capacitor segments;
a width and a thickness of each of the dielectric layers of the at least two capacitor segments; and
a width and a length of each of the at least one inductor stub.

14. The method for manufacturing the coaxial filter according to claim 13, wherein:
the coaxial filter further comprises a first conductor through which the first port is coupled to a first capacitor segment of the series of the at least two capacitor segments; and a second conductor through which the second port is coupled to a second capacitor segment of the series of the at least two capacitor segments, wherein the first and second capacitor segments are arranged respectively at two ends of the series of the at least two capacitor segments; and
the dimension parameters further comprise a width and a length of each of the first and second conductors.

15. The method for manufacturing the coaxial filter according to claim 14, wherein:
the coaxial filter further comprises a first impedance converter that is coaxially connected between the first conductor and the first capacitor segment, and configured to eliminate an impedance discontinuity of the coaxial filter; and a second impedance converter that is coaxially connected between the second conductor and the second capacitor segment, and configured to eliminate the impedance discontinuity of the coaxial filter; and
the dimension parameters further comprise a width and a length of each of the first and second impedance converters.

* * * * *